July 21, 1959 J. T. MATTHEWS 2,895,770
SWIVEL BEARING
Filed Jan. 9, 1956 3 Sheets-Sheet 1
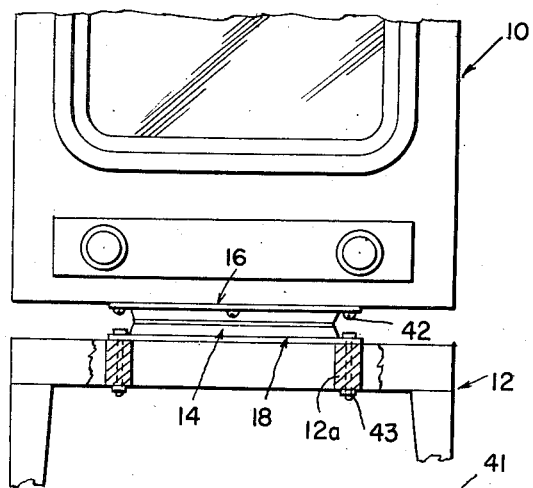
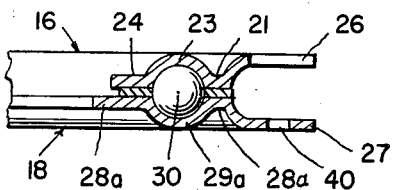
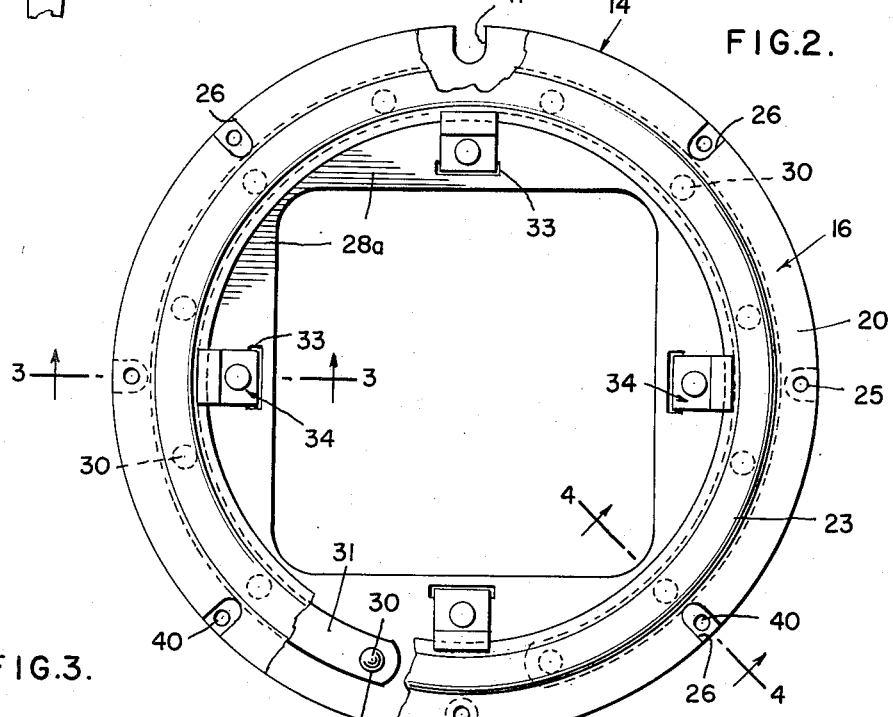
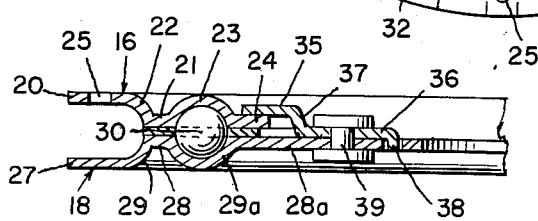
INVENTOR.
John T. Matthews
BY
Shoemaker & Mattare
ATTYS July 21, 1959     J. T. MATTHEWS     2,895,770
SWIVEL BEARING Filed Jan. 9, 1956     3 Sheets-Sheet 2

INVENTOR.
John T. Matthews
BY
Shoemaker & Mattare
ATTYS

July 21, 1959  J. T. MATTHEWS  2,895,770
SWIVEL BEARING
Filed Jan. 9, 1956  3 Sheets-Sheet 3

INVENTOR.
John T. Matthews
BY Shoemaker & Mattare
ATTYS

United States Patent Office 2,895,770
Patented July 21, 1959

2,895,770

SWIVEL BEARING

John T. Matthews, Charlotte, N.C., assignor to Wil-Mat Corporation, Charlotte, N.C., a corporation of North Carolina Application January 9, 1956, Serial No. 558,062

5 Claims. (Cl. 308—227)

This invention relates to improvements in bearings and is directed more particularly to bearings for swivelly or rotatably mounting heavy bodies.

Swivel bearings for rotatably mounting television sets, both for table and console models, are known. Such known bearings embody superposed members formed with opposing coacting or cooperating raceways for antifriction elements and a means for retaining the members in assembled relation for relative rotation. However, the construction or design of such known types or forms of bearings is such that an insufficient amount of metal is provided outside of the area defined by the raceways for effectively or satisfactorily mounting the swivel or securing it to the structure to be supported and to the underlying support, such as a table or other base structure.

An object of the present invention, in the light of the foregoing, is, accordingly, to provide a new and improved swivel construction for mounting television sets, either of the type known as a table model or console models, although the invention is not, of course, restricted to such use, wherein there is provided a means for coupling together relatively rotatable superposed members of such character that the restriction of the spacing or placement of holes for mounting screws, bolts or other securing elements is avoided, thereby providing for or allowing a greater amount of the metal on the outer side of the bearing races at the holes for mounting the plates or securing the plates to the bodies between which they are located.

Another object of the invention is to provide a swivel mounting of the character stated wherein the upper and lower plate members, which are separated by antifriction elements, are designed in a novel manner to facilitate the employment of coupling devices within the circular area defined by the raceways for the antifriction elements.

Still another object of the invention is to provide a swivel of the character stated wherein the upper and lower bearing plates are provided one with a means for attaching a retaining or coupling clip thereto and the other with an annular trackway with which a portion of the coupling clip or coupling clips engages, the trackway and coupling clips being located entirely within the circular area defined by the antifriction element raceways so that a maximum amount of the material of the upper and lower plate members is provided outside of the raceways for affixing the plate members to the two bodies between which the swivel is located for use.

A further and more specific object of the invention is to provide a new and improved swivel structure embodying superposed plates having a plurality of antifriction elements located therebetween and disposed in a circular arrangement, with a number of holding or coupling clips rigidly secured to one of the plates within the area defined by such antifriction elements and a means forming a part of the other plate over and against which portions of such clips extend and bear to maintain the plates against separatory movement while at the same time permit the plates to have desired relative rotary movement.

In addition to the foregoing, it is an object of the invention to provide in a swivel coupling of the character described in the preceding paragraph, a novel antifriction element between the holding or retaining clips and the said means engaged thereby whereby the two plates of the swivel may rotate relatively to one another noiselessly.

The invention will be best understood from the following detail description taken in connection with the accompanying drawings forming a part of the specification, with the understanding that the invention is not confined to a strict conformity with the showing of the drawings but may be changed or modified so long as such changes or modifications mark no material departure from the salient features of the invention as expressed in the appended claims.

In the drawings:

Fig. 1 illustrates an application of one embodiment of the present invention to a television cabinet and a supporting base therefor, the base being partially broken away to show details of construction;

Fig. 2 is a view in top plan of the embodiment of the swivel shown in Fig. 1, with a portion of the top plate broken away to show the antifriction ball spacing and retaining cage;

Fig. 3 is a sectional view taken substantially on the line 3—3 of Fig. 2;

Fig. 4 is a sectional view taken substantially on the line 4—4 of Fig. 2;

Referring now more particularly to the drawings, it will be seen that the bearing of the present invention has been shown or illustrated in two embodiments and while there are slight structural differences in the plate members which are separated by the antifriction elements, the essential or novel feature of the invention is present in both of such embodiments.

Figure 5:
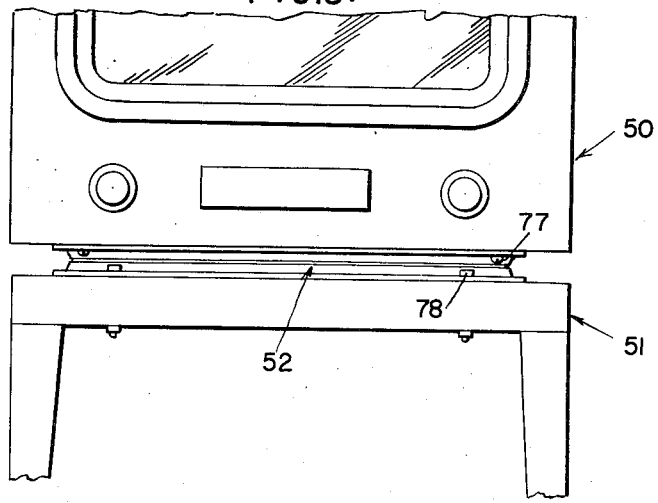
Fig. 5 is a view illustrating the application of a second embodiment of the invention, the same being shown in association with the lower part of a television cabinet and a supporting base therefor.

As hereinbefore stated, one embodiment of the swivel has been shown applied in Fig. 1 and a second embodiment has been shown applied in Fig. 5 and while applications have been shown in connection with television receivers, for which the invention is particularly well adapted to be used, it is to be understood that the invention is not in any way confined to such use but may be employed in any situation or location where it might be found to be of service.

Referring first to Figs. 1 to 4, inclusive, wherein one embodiment of the invention is shown, the numeral 10 generally designates a body of any type, such as a television cabinet or the like, mounted or supported upon a base 12 by means of the swivel mounting of the present invention which is generally designated 14.

The swivel 14 comprises the two plates 16 and 18 which, for convenience of description, will be referred to as the top plate and the bottom plate respectively, although it will be obvious that the swivel may be used in the inverted position if desired, without in any way altering its effectiveness.

The top plate 16 is, as shown, of circular or annular form and comprises the outer rim portion 20, and the inner portion 21 which is in a plane offset from the rim portion, being joined to the rim portion by the angled intermediate portion 22. The inner portion of the top plate is formed, preferably by pressing, to provide the annular antifriction element raceway 23. The depth of this raceway is such that the top or outer side lies below the plane of the top surface of the rim 20 so that no interference will be had from the raceway in the securing of the top plate to a flat surface such as the underside of the structure 10.

Within the raceway 23 there extends radially inwardly a flange 24 which constitutes or functions, in the manner hereinafter described, as a track.

The rim 20 is provided with a suitable number of apertures 25 for the reception of attaching screws, bolts or the like, and there are also formed in this rim a number of recesses 26 which facilitate the passage of attaching elements through apertures in the rim portion of the under plate, as hereinafter set forth.

The under or bottom plate 18 is, in this first embodiment of the invention, of circular form and preferably of the same diameter as the top plate. This under plate also comprises an outer rim which is designated 27 and an inner portion 28 which is connected to the rim 27 by an angular extension 29. The bottom plate has an inner or central part formed with a rectangular opening, as shown, thus providing a number of webs 28a and the portion 28 between the webs and the angular extension 29 is formed, by pressing or in any other suitable manner, to provide the antifriction raceway 29a which is of the same diameter as the raceway 23 with which it cooperates.

The coacting raceways 23 and 29a have therein a plurality of antifriction elements here shown in the form of bearing balls 30. These bearing balls are maintained in desired spaced relation in the raceways by the flat split annulus 31 which is formed of relatively thin metal and has a number of openings 32 in each of which a bearing ball is located and relatively loosely retained for desired rotation. The ball retaining frame or cage here shown as a split annulus, may, if desired, be in the form of a complete ring or annulus or of any other suitable character for maintaining the antifriction elements or balls 30 in the desired relation.

The two plate members 16 and 18 of the embodiment of the swivel under consideration, are retained against separatory movement but permitted relative rotary movement by the novel means about to be described.

Each of the web portions 28 of the plate 18 is provided with a slot opening 33, there being four of such slots here illustrated, but obviously more or fewer may be employed, if desired, as will be readily apparent.

At each of the slots 33 there is located a securing or holding clip which is generally designated 34. These clips are preferably formed from short strips of metal of suitable weight and character and are bent transversely intermediate their ends so as to provide the spaced parallel or offset tongue and body portions 35 and 36 respectively, connected by the intermediate portion 37.

The end of the body portion 36 of each clip is provided with a downturned or right angularly projecting flange 38 which is formed for engagement in a slot 33 and the spacing between tongue and body portions 35 and 36, or in other words, the offset of the tongue with respect to the body, is approximately equal to the thickness of the material of the track 24. Thus it will be seen upon reference to Fig. 3 that when the body portion 36 is placed upon the top of a web 28a with the flange 38 engaged in the adjacent slot 33 and the clip is directed outwardly, the tongue portion 35 will overlie and bear against the outer side of the adjacent circular track.

The body portion of each clip is provided with a suitable aperture for alignment with a corresponding aperture in the web 28a to receive a rivet 39, the ends of which are mashed or swaged over as illustrated and in the conventional manner to rigidly fasten the clip in position upon the supporting web portion of the plate 18.

The rim 27 of the plate 18 is, like the rim 20 of the plate 16, provided with a suitable number of apertures 40 for the passage of securing screws, bolts or the like, and this rim 27 is also provided with a number of edge recesses 41 to facilitate the passage of securing elements through the apertures 25 of the top or opposite plate. It will be apparent that the spacing of the recesses 41 in the plate 18 must agree with the spacing of the apertures 25 in the plate 16 and also that the spacing of the recesses 26 in the plate 16 must agree with the spacing of the apertures 40 in the opposite plate, the plate 18, so that no difficulty will be experienced in passing the securing elements through the apertures of the two plates in the mounting of the swivel in the manner shown in Fig. 1.

In Fig. 1 the plate 16 is shown as having securing elements 42 passed therethrough into the bottom or underside of the body 10 while the plate 18, which is shown resting upon members 12a of the base 12, is shown as having bolt elements 43 extending upwardly through suitable openings in the members 12a to pass through the apertures 40 of the plate 18 and receive nuts by which the bottom plate 18 is held in place.

Referring now to Fig. 5, the second embodiment of the swivel structure is illustrated supporting a cabinet structure 50 upon a base 51, this second embodiment being generally designated 52.

The second embodiment of the swivel structure also comprises two superposed plates one of which is designated generally by the reference character 53 and will be referred to as the upper or top plate, while the other plate is generally designated 54 and will be referred to as the bottom plate. However, as was pointed out in connection with the first embodiment, this swivel structure may be used in inverted position, if desired, without altering the operation thereof.

The top plate 53 is illustrated as being of rectangular form and is pressed or otherwise suitably constructed to form a raceway 54a corresponding to the raceway 23 of the first described embodiment.

The central part of the plate 53 is cut out forming the central opening 55 and one side of the raceway 54a is defined by the inwardly projecting circular track flange 56 which defines this opening while the opposite side of the raceway is joined by the narrow portion 57 to the main body of the plate by the upwardly and outwardly inclined connecting part 58.

Figure 6:
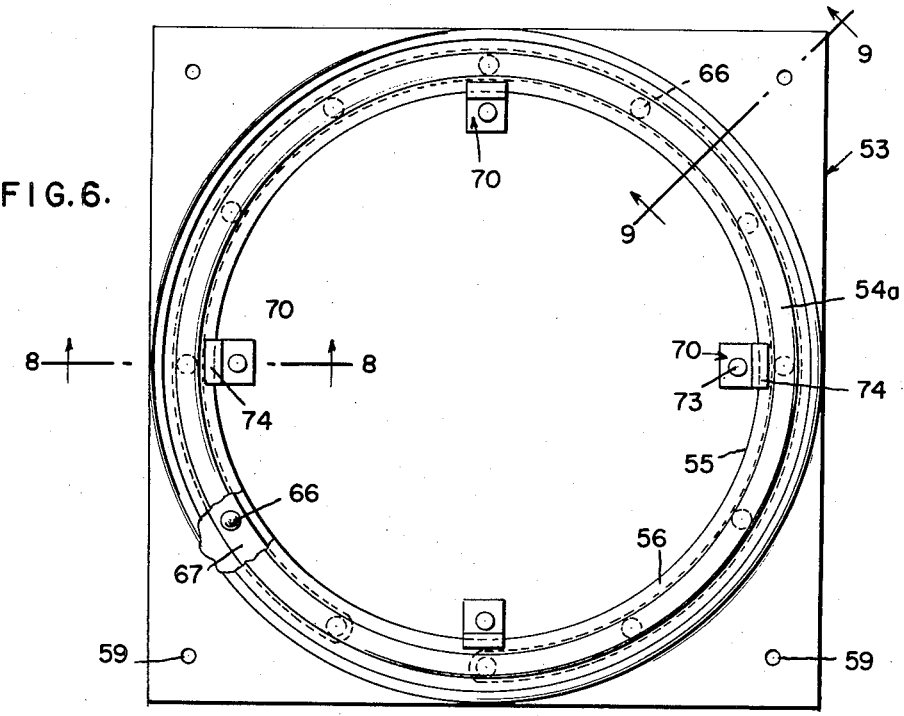
Fig. 6 is a view in top plan of the second embodiment with a portion of the top plate broken away.

The body of the plate 53 is provided at suitable locations, preferably at the corner portions thereof as shown in Fig. 6, with openings 59 for the reception of securing members, such as screws, bolts or the like.

Figure 7:
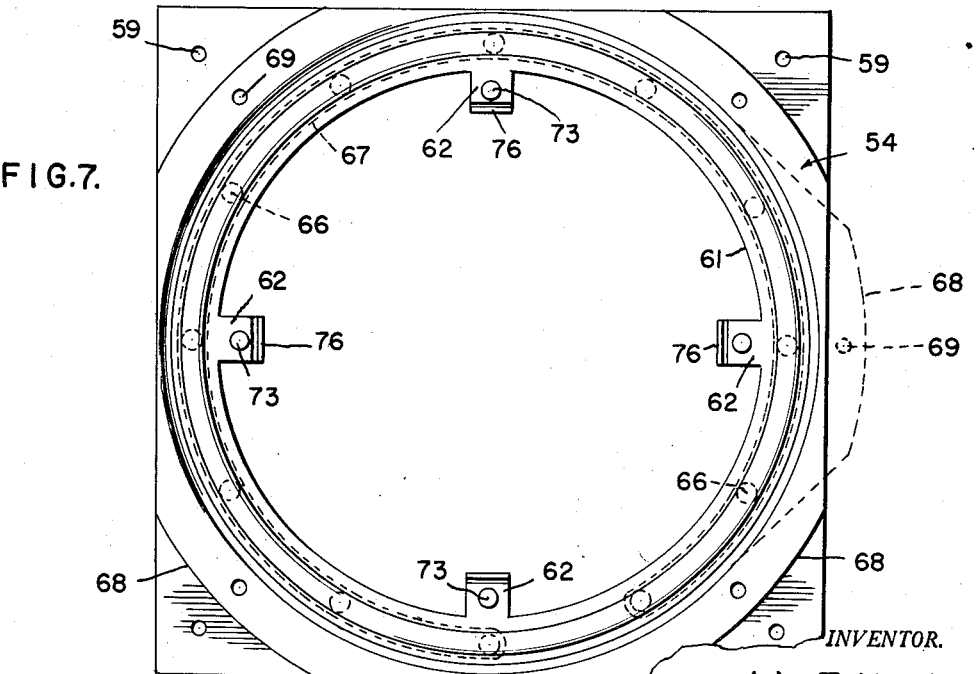
Fig. 7 is a plan view of the bottom or underside of the second embodiment illustrating in dotted lines the positioning of the bottom or under plate with respect to the top plate to facilitate the extension therethrough of a securing element or securing elements.

The plate 54 is also pressed to provide a raceway 60, the diameter of which is the same as the raceway 54a of the top plate 53 and the central part of this under plate 54 is also cut out in a circle as indicated at 61 and the edge of this cut out portion has extending therefrom a number of inwardly projecting tongues 62 which form integral extensions of the plate material and are directed radially inwardly as shown in Fig. 7.

Figure 8:
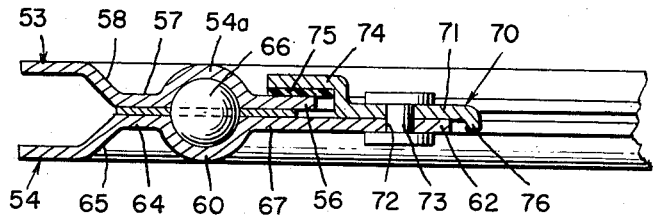
Fig. 8 is a sectional view taken substantially on the line 8—8 of Fig. 6.
Figure 9:
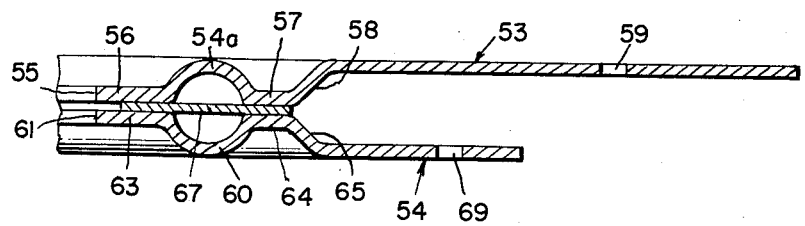
Fig. 9 is a sectional view taken substantially on the line 9—9 of Fig. 6.

The inner side of the raceway 60 is defined by the narrow flange 63 which is here shown as being of approximately the same width as the circular track forming flange 56, while the outer side of the raceway 60 is joined by the narrow metal portion 64 to the outer part of the plate by the outwardly extending and angularly disposed intermediate portion 65. As will be readily seen upon reference to Figs. 8 and 9, the flange 63 and the part 64 are in the same plane as are the track flange 56 and the part 57 of the top plate, these parts being in parallel relation when the top and the bottom plates are assembled for use and the concave sides of the raceways thus being disposed in cooperative relation to receive the bearing balls 66. These bearing balls are here shown as being retained in spaced relation in the raceways by a cage in the form of a split flat annulus 67 of the same form or construction as the cage 31 hereinbefore referred to. The diameters of the balls 66, as in the first embodiment, are such as to maintain the plates spaced apart slightly and in the space between the plates the cage annulus 67 lies as is clearly shown in Figs. 8 and 9.

As shown in Fig. 7, the plate 54 has its corner portions cut away or rounded as indicated at 68 so that when the straight side portions of this plate which lie between the rounded portions 68 are parallel with the sides of the plate 53, the plate 54 will not cover the openings 59 of the top plate, thereby allowing clearance for the passage of securing elements through these openings. Inwardly of each of the rounded corner portions 68 the material of the plate 54, at the outer side of the raceway 60 therein, is provided with an opening 69 and in order that securing elements may be passed through these openings without interference from the plate 53, the bottom plate 54 may be given a quarter turn so as to project each of the rounded corner portions 68 beyond a side edge of the plate 53 as shown in dotted lines in Fig. 7.

The radially inwardly extending tongue portions 62 which project from the edge of the opening 61 of the under plate each forms a support for a holding clip which is generally designated 70 and which is of the same form as the clips 34 hereinbefore described. The body portion 71 of each of these holding clips is provided with a suitable opening which, when such body portion is placed upon the top of a tongue 62, aligns with an opening 72 in the tongue to receive a securing element such as the rivet 73. The tongue portion 74 of the holding clip which is in offset parallel relation with the body portion 71, positions over the top of the track flange 56 and it may bear directly thereon in metal-to-metal contact, or the under face of the tongue may have secured thereto a suitable bushing or bearing material formed of nylon, Oilite, or other bearing material, as indicated at 75.

The clip 70, like the previously described clip 34, has at the end of the body portion 71 a flange 76 which engages across the free end of the plate body tongue 62 to which the securing or holding clip is riveted. This flange 76 prevents any turning of the clip on the supporting tongue.

When the swivel 52 is in use as shown in Fig. 5, suitable screws or bolts 77 may be passed through the apertures 59 of the top plate, when the swivel is placed with the plate 53 uppermost, and other securing elements, such as are indicated at 78, may be passed through the apertures 69 of the bottom plate into the base structure 51 to secure the television structure 50 or any other structure, such as a bookcase or the like, to the base for easy rotation thereon.

It will be seen from the foregoing that the swivel structure of the present invention in the two embodiments shown is of new and novel design whereby it can be made of extreme vertical thinness and also by the manner of locating the retaining or holding clips upon the inner side of the raceways or within the area defined by the circular raceways, considerably more material of the plates is provided on the outer sides of the raceways for the apertures or openings through which the holding screws, bolts or other fastening elements may be passed than is the case in other known swivel structures.

I claim:

1. A swivel comprising two substantially flat mounting plates arranged in superposed relation, each plate having a substantially centrally located opening therein, a plurality of rotatable antifriction elements disposed in a circular arrangement between the plates whereby relative rotation of the plates is permitted, means forming a part of one plate lying within the area defined by said arrangement of elements providing a flat circular relatively narrow track which is in a plane with the said elements and intersects the same, the other plate having inwardly extending integral parts and with integral portions of said parts extending inwardly and beyond said track and in the plane of the said elements, plate holding clips, each clip comprising a body portion secured to said inwardly extending portion of the said other plate and having an upwardly offset tongue overlying and coacting with the track to retain the plates against separating movement but permit rotation of one plate relative to the other, and means facilitating the attachment of the plates to bodies between which the swivel is located.

2. The invention according to claim 1, wherein the rigid securement of each clip to the said plate portion is effected by a fastener passing through the clip body portion and the inwardly extending plate portion, and coacting means between the clip body portion and the plate portion for holding the clip against turning about the fastener.

3. The invention according to claim 1, with a friction reducing means between the tongue and the surface of the track opposed thereto.

4. The invention according to claim 1, with a body of friction reducing material secured to the face of the tongue opposing the track and slidably engageable with the track.

5. The swivel as defined in and by claim 1, wherein the said other plate has a plurality of apertures therein within the said area, and the clip members each comprise a body secured on the inwardly extending portion of the said other plate and an end portion engaged in one of said apertures and with the opposite end portions forming the offset tongue and overlying and coacting with said track.

References Cited in the file of this patent

UNITED STATES PATENTS

| | | |
|---|---|---|
| 671,736 | Stimpson | Apr. 9, 1901 |
| 939,443 | Rader | Nov. 9, 1909 |
| 1,801,204 | Leuzinger | Apr. 14, 1931 |
| 2,584,184 | Brown | Feb. 5, 1952 |
| 2,648,579 | Slyter et al. | Aug. 11, 1953 |
| 2,671,631 | Fox | Mar. 9, 1954 |